April 28, 1959 J. T. WARNOCK 2,884,544
ELECTRICAL CIRCUITS EMPLOYING SEMICONDUCTOR DEVICES
Filed Feb. 17, 1954
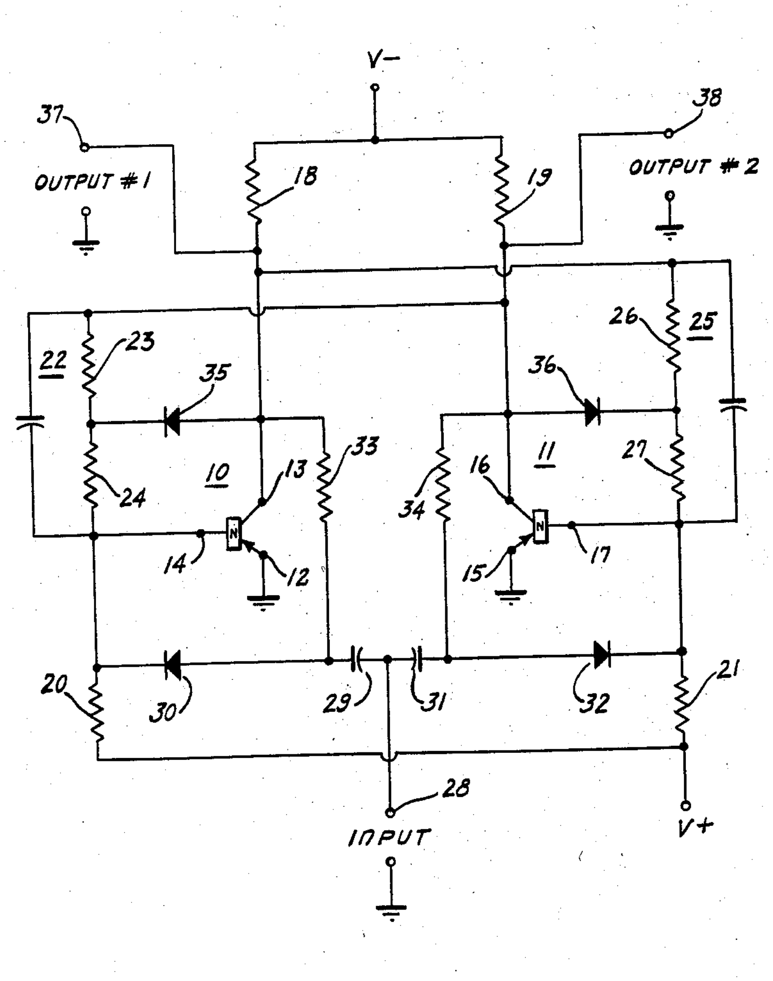
INVENTOR.
JAMES T. WARNOCK
BY
ATTORNEY United States Patent Office 2,884,544

Patented Apr. 28, 1959

2,884,544

ELECTRICAL CIRCUITS EMPLOYING SEMI-CONDUCTOR DEVICES

James T. Warnock, Ardmore, Pa., assignor to Philco Corporation, Philadelphia, Pa., a corporation of Pennsylvania Application February 17, 1954, Serial No. 410,758

9 Claims. (Cl. 307—88.5)

The invention relates to improvements in circuits utilizing semi-conductor amplifier elements, and more particularly to means for enhancing the rapidity with which such circuits respond to variations in applied signals.

The semi-conductor amplifier elements to which I refer are devices which consist fundamentally of a body of semi-conductive material which is contacted by at least three separate electrodes. Usually, two of these electrodes have so-called rectifying characteristics, which means that they present much higher resistance to the flow of current in one direction through them than to the flow of current in the opposite direction, while the third electrode has so-called ohmic characteristics, which means that it presents substantially equal resistance to the flow of current in either directions therethrough.

Several physical forms of semi-conductor amplifier elements are known. These include, for example, the so-called junction transistors, which may be of either the N-P-N or of the P-N-P type, the so-called point contact transistors and the so-called surface-barrier transistors. The structural details of these forms of such semi-conductor elements are sufficiently well known that they do not require extensive review here. In order to utilize the amplifier characteristics of such elements, whether they be of any one of the forms hereinbefore referred to, or of still other forms which have been developed even more recently, it is necessary to supply certain unidirectional operating potentials to the various electrodes. In particular, one of the aforementioned rectifying electrodes contacting the main body of semi-conductor material is biased in the forward direction by the application of a suitable unidirectional potential between this electrode and the ohmic electrode, while the other rectifying electrode is simultaneously biased in the reverse direction by the application of a suitable potential between this latter rectifying electrode and the ohmic electrode. When this has been done, then variations in the current supplied to the forwardly biased electrode, such as might be produced by variations in the potential applied between this electrode and the ohmic electrode, will modify the intensity of the output current of the element, flowing through the reversely biased rectifying electrode. As is well known, the amplifying characteristic of the element stems from the fact that comparatively small variations in the supplied current can produce very pronounced changes in the output current.

In this connection it is noted that the forwardly biased rectifying electrode of a semi-conductor element of the kind under consideration is conventionally known as the emitter electrode, while the reversely biased electrode is known as the collector electrode, and the ohmic electrode is known as the base electrode. In the discussion which follows it will be convenient to designate the various electrodes by this conventional nomenclature.

It has been found that variations in input current to such semi-conductor elements occurring at rates below a certain critical value were followed by corresponding variations in output current. On the other hand, variations in input current occurring at a rate in excess of this critical value were followed by corresponding variations in output current at a substantially lower rate than the variations in input current.

It will be apparent that this characteristic of semi-conductor amplifier elements sharply limits their usefulness in circuits in which rapid variations in input signals must be faithfully reproduced. While this is a requirement in a number of circuit applications, it is particularly important in switching and/or pulse forming circuits. This is because, in such circuits, it is frequently desirable to produce an output signal which is subject to extremely abrupt variations. Where that is the case, the aforementioned critical value of rate of change of output current for semi-conductor elements can easily be exceeded, even though successive variations recur at a much lower rate. When this happens the waveform of the output signal becomes distorted. In investigating this difficulty it was found, first of all, that the difference between the rates of input and output signal variation of the semi-conductor amplifier element is particularly pronounced when the variation in input signal is such as to produce a decrease in output current.

It has also been found that the aforementioned critical value in the rate of change of input current, beyond which the output current is no longer capable of varying at substantially the same rate as the input current, depends upon the absolute value of the output current at the time when these current variations are initiated. More particularly the critical value of signal variation rate becomes lower with increasing values of the initial output current of the element.

It is now believed to be apparent that, if a certain rate of response is required for a particular semi-conductor element, then the operating parameters of this element must be adjusted in such a way that its output current does not exceed that value which would cause its rate of response to fall below the prescribed value. At the same time the danger point at which this occurs should be approached as closely as possible, otherwise operating efficiency is diminished.

The compromise adjustment which must be made to meet the foregoing conflicting requirements could be effected by appropriate proportioning of the circuit components which determine the aforementioned operating parameters only if these characteristics of the semi-conductor element which determine the critical values under consideration remained substantially fixed over long periods of time. In practical embodiments of such elements, it has not proved possible to achieve such stability of characteristics. Furthermore different samples of any particular form of semi-conductor element also have appreciably different characteristics in this respect so that any compromise adjustment of components would be upset by replacement of the particular element.

It has also been attempted to readjust the circuit components associated with the semi-conductor element each time a change in its operating characteristics takes place. However, this is clearly an extremely tedious process which cannot be practiced at all unless frequent measurements are taken and adjustable components are provided. All this is clearly very costly.

The aforementioned task of readjustment of components, which is unattractive under any circumstances, becomes even more forbidding when several of the semi-conductor elements in question are used in a circuit arrangement in which they interact intimately with each other. Such a situation arises, for example, in multivibrator circuits which use semi-conductor elements in pairs, with such cross-connections between them that modification of any circuit component associated with them will produce changes in the operating characteristics of both.

Accordingly, it is a primary object of the invention to provide circuits which employ semi-conductor amplifier elements and which are characterized by rapid response to variations in applied signals.

It is another object of the invention to provide circuits employing semi-conductor amplifier elements wherein the output currents of these elements may be reduced rapidly.

It is still another object of the invention to provide pulse forming circuits employing semi-conductor amplifier elements and characterized by being productive of pulses having waveforms with unusually steep edges.

It is a still further object of the invention to provide circuits employing semi-conductor amplifier elements which operate at maximum efficiency consistent with satisfactory response rapidity and which do not require readjustment of components to compensate for variations in semi-conductor element characteristics.

When, in a circuit which includes at least one semi-conductor amplifier element, this element is caused to produce an appreciable output current by the application of an appropriate signal to its input electrodes, there are also produced certain changes in the potentials developed at its output electrodes. In particular it may be shown that any increase in the flow of output current from the element tends to cause a reduction in that potential difference which must be maintained between the output electrodes of the element in order to bias its output, or collector electrode in the proper direction for amplification, i.e. in the reverse direction.

It has further been found that there is a definite relationship between the lowest value which the potential difference between output electrodes reaches during increasing output current flow and the rapidity with which the output current decreases following a change in the input signal which is productive of such a decrease. More particularly, a given decrease in output current occurs much more slowly when the initial potential difference between output electrodes is low than when it is high.

Finally it has been found that the aforenoted relationship between minimum potential difference and response rapidity of the semi-conductor element is subject to substantial and unpredictable variations from time to time in any given sample of such an element, while different samples may vary even more widely in this respect.

In accordance with my invention, these unpredictable variations are eliminated by providing, between the collector electrode and the base electrode, not only the usual bias and load connections, but also a connection which is so constructed and arranged that it has no effect upon variations in the potential difference between these electrodes so long as this potential difference is of the proper polarity for amplification and in excess of a predetermined value, but operates to establish this potential difference at the aforementioned value whenever it tends to decrease below that value.

In a preferred embodiment of my invention the connection under consideration may comprise a unilaterally conductive device having one electrode connected to the collector and the other to one terminal of an impedance element. The other terminal of this impedance element is then connected to the base electrode. Means are provided for establishing, across the aforementioned impedance element, a potential which is substantially equal to the minimum potential difference which it is desired to maintain between the collector and base electrodes, and which has the same polarity as the reverse bias potential of the semi-conductor element. The unilaterally conductive device is then so poled that it remains non-conducting so long as the potential difference between collector and base electrodes has the same polarity as the potential established across the impedance element and at least as great an absolute value. This device will then conduct whenever the potential difference between the electrodes tends to fall below the value of the potential established across the impedance element. Since the unilaterally conductive device has an internal potential drop, when conducting, which is very small compared to the potential developed across the impedance element, this arrangement clearly operates in accordance with the invention, namely to prevent the potential difference between collector and base electrodes from falling below a predetermined minimum value. By appropriate proportioning of the impedance element and of the potential developed across it, this minimum potential difference may be set at any value necessary for operation at maximum efficiency consistent with the required response rapidity.

In a practical arrangement, the unilaterally conductive device provided in accordance with my invention may be simply a diode vacuum tube, or a semi-conductor junction, connected in the circuit with the polarity hereinbefore indicated, while the impedance element may be a portion of the total resistive load impedance which is normally provided between collector and base electrodes. The potential developed across this impedance will then be derived from the conventional source of operating potentials.

The details of construction and operation of circuits embodying my invention will be better understood from the detailed discussion which follows and from the accompanying drawing wherein the single figure shows a bi-stable multivibrator circuit which includes semi-conductor amplifier elements and which embodies my invention.

In its basic configuration the circuit illustrated in the drawing, to which more particular reference may now be had, is a bi-stable multivibrator circuit of known form. This circuit includes two semi-conductor amplifier elements, respectively designated by reference numerals 10 and 11, each represented in conventional diagrammatic manner in the figure and each provided with conventional emitter, collector and base electrodes. The emitter, collector and base electrodes of element 10 are designated respectively by reference numerals 12, 13 and 14, while the corresponding electrodes of element 11 are designated respectively by reference numerals 15, 16 and 17. In the particular form illustrated, the emitter electrode of each of these semi-conductor elements is grounded. To the other two electrodes of each element there are supplied appropriate unidirectional operating potentials from conventional sources of such bias potentials, namely from a conventional source of positive bias potential V+ and from a conventional source of negative bias potential V−. While the values and polarities of these sources of bias potential will depend upon the particular forms of semiconductor elements which are used in the circuit, the determination of both of these parameters for any particular situation is well within the skill of a worker in the art. The semi-conductor amplifier elements themselves may also be of any known form. For example, they may be of the so-called point contact type, or of the junction type. If they are of the latter type, then they may again be either of the so-called P–N–P type or of the so-called N–P–N type. Assuming, for purposes of description only, that these semi-conductor elements are of the P–N–P, junction type then the source of negative bias potential V− is connected to the collector electrodes 13 and 16 of the semi-conductor elements. These connections are, of course, not made directly but through load resistors 18 and 19 respectively. The base electrodes 14 and 17 of these semi-conductor elements, on the other hand, are both connected to the source of positive bias potential V+ through resistors 20 and 21, respectively. In addition, the base electrode 14 of element 10 is connected to the collector electrode 16 of element 11 through a parallel resistance-capacitance network 22, whose resistive component is formed of two series resistors 23 and 24. The base electrode 17 of semi-conductor element 11, on the other hand, is connected to the collector electrode 13 of element 10 through a similar parallel resistance-capacitance network 25 whose resistive component is also constituted of two series connected resistors 26 and 27. So far, the only departure from known forms of bi-stable multivibrator circuits is the use of two series connected resistor elements, instead of a single resistor element, in the cross-connections between the base and collector electrodes of the elements.

As its name indicates, the circuit under consideration is stable in either one of two conditions, namely (1) with semi-conductor element 10 conducting heavily and semi-conductor element 11 substantially non-conducting and (2) with these conduction states reversed, i.e. with semi-conductor element 10 substantially non-conducting and with semi-conductor element 11 heavily conducting.

As is common for circuits of this nature, a triggering pulse must be applied to it to initiate the change from one of its stable conditions to the other. The next triggering pulse then reverses the conduction states of the semi-conductor elements again and causes a reestablishment of the circuit in its initial condition. In the circuit under consideration the necessary trigger pulses are applied to an input terminal 28 from a conventional source of such trigger pulses (not shown). This input terminal 28 is connected to the base electrodes of both semi-conductor elements. More particularly the input terminal 28 is connected to the base electrode 14 of element 10 through the series combination of D.-C. blocking capacitor 29 and unilaterally conductive element 30, while the same input terminal 28 is connected to the base electrode 17 of element 11 through the series combination of D.-C. blocking capacitor 31 and unilaterally conductive device 32. From the junction of capacitor 29 and device 30, a resistor 33 leads to collector electrode 13 of element 10, while from the junction of capacitor 31 and device 32 a resistor 34 leads to the collector electrode 16 of element 11. The unilaterally conductive devices 30 and 32, which may take any conventional form such as, for example, that of vacuum tube diodes or of semi-conductor junctions, are so poled that positive pulses applied to input terminal 28 will tend to drive them into conduction. These unilaterally conductive devices cooperate with the resistors which connect them to the respective collector electrodes of the semi-conductor elements, in a manner which is explained in detail hereinafter, to steer the applied trigger pulses selectively toward one or the other of the semi-conductor elements, thereby assisting in effecting a change in the entire circuit from one of its stable conditions to the other.

The only other circuit components which require mention are the unilaterally conductive devices 35 and 36, which are connected, respectively, between the collector electrodes 13 and 16 of the semi-conductor elements and the junctions of the series resistors of the R-C networks 22 and 25 associated with these elements. In their particular connections these unilaterally conductive devices 35 and 36 serve, in a manner which will be described in detail hereinafter, to achieve the aforestated objects of my invention.

The operation of the circuit can best be described by assuming arbitrarily that the circuit is initially in one of its stable conditions. The operation of various circuit components under these stable conditions, and also the effect of applying a condition reversing pulse, may then be described conveniently. Assuming, for example, that the circuit is in that stable condition in which element 10 is substantially non-conducting, while element 11 is intensely conducting, there flows through the load resistor 19 of element 11 the intense output current of this element. This load resistor 19 is preferably so proportioned that its resistance is substantially greater than the internal resistance of the element, when the latter is conducting. Consequently the collector electrode 16 of element 11 becomes established, during conduction, at a potential which is only slightly negative with respect to the ground potential at which the emitter 15 of element 11 is established. By reason of the conduction connection between the collector 16 of element 11 and the R-C network 22, the upper end of resistor 23 of this network will also be established at the slight negative potential of collector 16. Across the three series connected resistors 23, 24 and 20, there will therefore be developed a total potential difference which is equal to the sum of the potential supplied by the source of positive bias potential V+ and the slight negative potential supplied from collector 16. The values of the several resistors are so proportioned, relative to each other, that most of this potential difference is developed across resistor 20. Consequently the junction of resistors 20 and 24, to which the base electrode 14 of semi-conductor element 10 is connected, will be maintained at an appreciable positive potential relative to ground potential. Since this semi-conductor element 10 has been assumed to be of the P–N–P junction type, which cannot conduct appreciably unless the base electrode is biased negatively relative to the emitter electrode, the positive bias, which is in fact applied to this base electrode when the other semi-conductor element (namely element 11) is conducting, serves to cut-off the element 10. In its cut off state, only very little output current flows from this semi-conductor element and through its load resistor 18. Furthermore the load resistor is so proportioned that its resistance is much smaller than the internal resistance of the element, when the latter is substantially non-conducting. Consequently the collector electrode 13 will assume a negative potential substantially equal to the negative potential which is developed by the source of negative bias potential V—.

One of the two output terminals of the multivibrator, namely terminal 37, is connected to this collector electrode 13, and at this terminal 37 there will therefore appear a potential which is also approximately equal to the negative bias potential V—. As has been pointed out, the negative potential developed at the collector 16 of element 11, on the other hand, will be much lower than the negative potential at collector 13 of element 10. Consequently the output potential which appears at the second output terminal 38, which is connected to the collector 16, will also be much smaller than the potential at output terminal 37.

Assume now that a positive pulse is applied to the input terminal 28 of the circuit for the purpose of initiating the chain of events which leads to the establishment of the circuit in its other stable condition. This applied pulse is transmitted by capacitors 29 and 31 to both of the unilaterally conductive devices 30 and 32. It will be recalled that the electrode of device 30 to which capacitor 29 is connected is also connected to the collector electrode 13 of element 10 by way of resistor 33. Since, as has been pointed out, this collector electrode 13 is substantially at the potential of the source of negative bias potential V—, the connection between device 30 and capacitor 29 will also be at this value of negative potential. It is apparent that the presence of this negative potential prevents the device 30 from conducting and from transmitting the applied pulse to the base electrode 14 of semi-conductor element 10 so long as the amplitude of the applied positive pulse does not exceed this negative potential. In the assumed initial condition of the circuit, the application of a positive pulse to base electrode 17 would interfere with the proper operation of certain portions of the circuit. Therefore the positive trigger pulse is preferably supplied with insufficient amplitude to overcome the negative potential applied to unilaterally conductive device 30. Considering now the device 32, on the other hand, to which the same positive pulse is supplied, it will be recalled that this device is connected to the collector electrode 16 of semi-conductor element 11 through resistor 34. In the assumed initial condition of the circuit, this semi-conductor element 11 is in its intensely conducting state and its collector potential is therefore only slightly below ground potential. Consequently the device 32 will be prevented from conducting only by this small negative potential. The positive input pulse should therefore have sufficient amplitude to overcome the negative potential applied to device 32, so that this element will be rendered conductive by the application of such a pulse and will transmit the pulse to the base electrode 17 of semi-conductor element 11. The amplitude of the positive input pulse should also be be sufficiently great to overcome the negative operating potential which is applied to base electrode 17, during conduction of the semi-conductor element 11, by the cooperative action of the sources of bias potential V+ and V− and the resistors 18, 26, 27 and 21 which are connected in series between these sources. When these simple conditions are met, the application of a positive pulse to the base electrode 17, in the manner which has been described, results in cutting off the current flow in semi-conductor element 11. This causes a corresponding reduction in the current flowing through its load resistor 19, in consequence of which the potential at collector electrode 16 becomes suddenly substantially more negative. In fact, since the collector current drops to a value close to zero, the collector potential approaches very closely the value of the negative bias potential developed by source V−. One consequence of this change in collector potential is a corresponding change in the potential of output terminal 38, which now also assumes a negative potential close to that developed by the source of negative bias potential V−. A second consequence is that the base electrode 14 of semi-conductor element 10, which is connected to the collector electrode 16 of semi-conductor 11 by way of R-C network 22 will also become substantially more negative than the grounded emitter electrode 12 of semi-conductor element 10. Consequently intense collector current will begin to flow through semi-conductor element 10 and through its load resistor 18 so that the collector potential, and with it the potential at the output terminal 37, will assume a value only slightly below ground potential. In this manner the application of a positive pulse to input terminal 28 effects the desired change in the condition of the circuit, whereby the output potential developed at terminal 38 is made substantially more negative than that at terminal 37. It will further be apparent that the next succeeding positive pulse which may be applied to input terminal 28 will cause a return of the circuit to its initial condition by cutting off the semi-conductor element 10, and by causing intense collector current flow in semi-conductor 11.

It will now be apparent that, in the absence of rectifier elements 35 and 36 whose effect on the circuit will be described presently, the base potential, which is applied to each semi-conductor element when it is in its intensely conducting state, can be adjusted to any desired value by appropriate proportioning of the resistors which are connected in series between the sources of positive and negative bias potential. In order to cause conduction through the semi-conductor element, this base potential must be more negative than that of the emitter electrode, which means, in the particular circuit illustrated, that it must be negative with respect to ground potential. As has been pointed out, the collector electrode is also negative with respect to ground potential during conduction, but only slightly so, owing to the development of a large potential difference across its load resistor. However this collector electrode must, in any case, be still more negative than the base electrode (otherwise the amplifying properties of the element are lost). At the same time, in order to obtain maximum output current from the semi-conductor element, it is desired to make this base electrode as negative as possible, consistently with other requirements. The extent to which it is permissible to let the negative potential applied to the base electrode, during conduction of the element, approach the greater negative potential which appears on the collector electrode during conduction, depends upon the rapidity with which the element is required to respond to a positive pulse which may be applied to the base electrode for the purpose of cutting the element off. More particularly, it has been observed that this response becomes slower as the potential values in question approach each other more closely. While I do not wish to be limited to the following explanation of this phenomenon it is my present belief that, as the difference between the collector and base potentials becomes less, the collector becomes correspondingly less capable of collecting all the charge carriers (holes in the case of the P-N-P junction element under consideration) which are supplied to it during conduction, so that an accumulation of excess charge carriers takes place. When the base electrode is driven positive in an attempt to cut the element off, the resultant increase in the potential difference between collector and base electrodes will enable the collector electrode to collect the excess charge carriers which had previously accumulated, with the result that collector current flow will continue for some time after application of the cut-off pulse, in spite of the fact that no new charge carriers are being supplied to this electrode.

In any event, irrespective of the correctness of the foregoing theoretical explanation, it remains a fact, based on actual observations, that the requirements of high current operation and rapid response are conflicting and that a compromise between them must be made in any particular situation. It is also a fact that circuit components which produce the proper compromise bias values for one sample of a given type of semi-conductor element often do not produce the proper biases for any other sample of the same type of element. Furthermore the bias requirements of the same element may be different at different times, depending notably upon the ambient temperature at which the element is operated. While the cause of these variations in bias requirements has not been conclusively identified there is evidence that they may be due principally to variations in the value of "$\alpha$" of the semi-conductor elements. This is the conventional designation applied in the semi-conductor art to the ratio between the collector and emitter currents which flow when the element is in conduction, and proper operating biases are applied. It is apparent that, for different values of "$\alpha$," a given input signal will produce different collector currents and different collector-to-base potentials, with consequent departures from the optimum adjustment of this relationship. The unilaterally conductive devices 35 and 36, together with resistors 24 and 27 to which they are respectively connected, operate to limit the extent to which the collector and base potentials of the respective elements may approach irrespective of the value of "$\alpha$" or of any other parameters of the semi-conductor elements. Consider, for example, the unilaterally conductive device 36. This device, which may be a vacuum tube diode, or a semi-conductor junction, or of any other conventional form, but which is preferably a crystal diode, is connected in such a manner that a change in collector potential which would tend to make this potential more positive than the potential which exists at the junction of resistors 26 and 27 causes device 36 to conduct and to reestablish the two points which it interconnects at substantially the same potential. Since the base electrode 17 is connected to the opposite end of resistor 27, i.e. to a point at which the potential is always more positive than the point to which device 36 is connected, it is apparent that as a further consequence of the presence of device 36, the base electrode 17 will always be maintained positive with respect to the collector electrode 16 by an amount which is at least equal to the potential drop across resistor 27.

This will be the case regardless of any tendency of the potential of collector electrode 16, during conduction of element 11, to approach the base potential more closely. The operation of unilaterally conductive device 35 is similar to that of device 36 in this regard. More particularly device 35 operates to maintain the collector electrode 13 of semi-conductor element 10 at a potential which is more negative than the potential of base electrode 14 by an amount substantially equal to the potential across resistor 24.

The exact values of the various circuit components involved depend, of course, upon the particular requirements of the application which is contemplated for a circuit embodying my invention. However, if there is kept in mind the foregoing description of the basic relationships which must exist in such a circuit in order to operate in accordance with the invention, it becomes a routine matter, entirely within the skill of a worker in the art, to provide components having the proper values.

For exemplary purposes only, there is listed below a set of typical values for the circuit components illustrated, which permit operation of the circuit at pulse repetition rates up to approximately two hundred thousand per second, without appreciable distortion of pulse waveforms, in spite of variations in the value of "α" of the semi-conductor elements involved between 0.92 and 1.00.

| | |
|---|---|
| Source of bias potential V− | −6 volts. |
| Source of bias potential V+ | +6 volts. |
| Each capacitor | 470 micromicrofarads. |
| Resistors 18, 19, 24 and 27 | 2,200 ohms each. |
| Resistors 23 and 26 | 10,000 ohms each. |
| Resistors 33 and 34 | 22,000 ohms each. |
| Resistors 20 and 21 | 47,000 ohms each. |

It will be understood that the problem of decreasing response rapidity with increasing current output is not peculiar to bi-stable multivibrators, but occurs also in other circuits using semi-conductor elements. It will be apparent that any circuit which presents this same problem may be modified to good advantage in a manner analogous to that illustrated for the multivibrator circuit under consideration. The principal reason for describing the invention herein with reference to a multivibrator circuit has been that the great complexity of this circuit makes the use of the invention therein particularly advantageous. This is because, in this type of circuit, the operation of one semi-conductor element affects that of the other semi-conductor element, and any disturbance in the operation of one is capable of putting the entire circuit out of operation.

In view of the numerous alternative forms which embodiments of my invention can take without departing from my inventive concept, I desire the scope of my invention to be limited only by the appended claims.

I claim:

1. In combination: a semi-conductor amplifier element having at least emitter, collector and base electrodes and connected in the common-emitter circuit configuration; means for applying signals between said base and emitter electrodes; and means for maintaining a collector-to-base potential of a predetermined polarity such as to reverse-bias said collector element and of at least a predetermined minimum magnitude, said means comprising an impedance element having at least two terminals and having one of said terminals connected directly to said base electrode, means for developing at the other of said terminals a potential of said predetermined magnitude and of said predetermined polarity relative to the potential at said base electrode, and means for short-circuiting said other terminal of said impedance element directly to said collector electrode whenever the magnitude of said collector-to-base potential tends to decrease below said minimum magnitude, said last-named means comprising a unilaterally conductive device having a first terminal connected to said collector electrode and a second terminal connected to said other terminal of said impedance element, said device being so poled as to be substantially non-conducting when the potential at said first terminal thereof is of said predetermined polarity with respect to the potential at said second terminal thereof, and to become conducting when the potential at said first terminal thereof tends to assume an opposite polarity with respect to the potential at said second terminal thereof.

2. The apparatus of claim 1 further characterized in that said unilaterally conductive device is a crystal diode.

3. The apparatus of claim 1 further characterized in that said impedance element is a resistor.

4. In combination: a semi-conductor amplifier element having at least emitter, collector and base electrodes; a source of reverse bias potential of predetermined magnitude with respect to the potential of said base electrode; a load impedance element connected between said collector electrode and said source of reverse bias potential; means for applying between said emitter electrode and said base electrode, forward bias potentials of varying magnitude, thereby to cause variations in collector current intensity and also variations in the potential difference between said collector and base electrodes; means for opposing the tendency of said potential difference between collector and base electrodes to fall below a predetermined magnitude, in response to the flow of collector current in excess of a predetermined intensity, said means comprising a plurality of impedance elements connected in series between said source of reverse bias potential and said base electrode; and a unilaterally conductive device connected between said collector electrode and the connection between two of said impedance elements, said device being so poled as to be substantially non-conducting when the potential difference between said collector and base electrodes exceeds the potential difference between said connection and said base electrode, and to become conducting when said potential difference between collector and base electrodes tends to fall below said potential difference between said connection and said base electrode.

5. The apparatus of claim 4 further characterized in that said collector load impedance element and each of said series connected impedance elements have finite values of impedance at all rates of forward bias potential variation.

6. The apparatus of claim 4 further characterized in that each of said impedance elements includes a resistive component.

7. A semiconductor amplifying system comprising a transistor having emitter, collector and base elements, circuit means for connecting said transistor in the common emitter configuration, said transistor and said circuit means being such that said collector element is normally biased in the reverse direction with respect to said base element and such that collector saturation is produced in said transistor by voltages of greater than a predetermined magnitude applied between said base element and said emitter element in the direction to forward bias said emitter element, means for applying between said base element and said emitter element varying voltages having magnitudes intermittently greater than said predetermined magnitude, and an asymmetrically conductive device connected between said base element and said collector element and normally biased in its less conductive condition but responsive to said application of said voltages of greater than said predetermined magnitude to assume its more conductive condition, thereby to prevent said collector from becoming forward biased with respect to said base element.

8. The apparatus of claim 1 comprising, in addition, potential supply means for normally biasing said collector electrode in the reverse direction with respect to said base electrode and in the direction to collect minority carriers injected by said emitter electrode, a second impedance element in series between said collector electrode and said supply means, and a third impedance element connected between said other terminal of said first impedance means and said supply means.

9. The apparatus of claim 8, in which said impedance elements are primarily resistive.

References Cited in the file of this patent

UNITED STATES PATENTS

| | | |
|---|---|---|
| 2,629,833 | Trent | Feb. 24, 1953 |
| 2,644,887 | Wolfe | July 7, 1953 |
| 2,655,608 | Valdes | Oct. 13, 1953 |
| 2,703,368 | Wrathall | Mar. 1, 1955 |
| 2,714,702 | Shockley | Aug. 2, 1955 |

OTHER REFERENCES

Trent: "Stabilized General Purpose Two-Transistor Binary Counter"; The Transistor; Bell Telephone Laboratories Inc.; pages 469–482, June 29, 1952.